United States Patent [19]

Wingfield et al.

[11] Patent Number: 4,648,119
[45] Date of Patent: Mar. 3, 1987

[54] METHOD AND APPARATUS FOR FORMING 3×3 PIXEL ARRAYS AND FOR PERFORMING PROGRAMMABLE PATTERN CONTINGENT MODIFICATIONS OF THOSE ARRAYS

[75] Inventors: Perry E. Wingfield, Tigard; Bruce E. Petrick, Lake Oswego, both of Oreg.

[73] Assignee: Tektronix, Inc., Beaverton, Oreg.

[21] Appl. No.: 713,507

[22] Filed: Mar. 18, 1985

[51] Int. Cl.[4] .............................................. G06K 9/00
[52] U.S. Cl. ..................................... 382/27; 358/263; 382/56
[58] Field of Search ....................... 382/56, 50, 34, 27, 382/54, 49; 358/263

[56] References Cited

U.S. PATENT DOCUMENTS

| | | | |
|---|---|---|---|
| 4,298,858 | 11/1981 | Romanski | 382/27 |
| 4,301,443 | 11/1981 | Sternberg et al. | 382/27 |
| 4,354,243 | 10/1982 | Ryan et al. | 382/54 |
| 4,365,304 | 12/1982 | Ruhman et al. | 382/54 |
| 4,369,430 | 1/1983 | Sternberg | 382/27 |
| 4,566,039 | 1/1986 | Oya | 358/263 |
| 4,574,394 | 3/1986 | Holsztynski et al. | 382/49 |

Primary Examiner—Leo H. Boudreau
Assistant Examiner—Anne Skinner
Attorney, Agent, or Firm—Allston L. Jones; Francis I. Gray; Robert S. Hulse

[57] ABSTRACT

Apparatus for defining a bank of sequential windows from a raster-scanned image of a document for storage in a data base. In addition, the apparatus includes a look-up table for each window wherein the bit pattern of the window is used to determine the correction factor which is applied to the next window as the "new" bit from a set of patterns and correction factors derived from well known algorithms developed to minimize the amount of data needed to electronically recreate a given document. The apparatus also includes storage devices to permit the application of the algorithm in overlapping pieces over the face of the document.

9 Claims, 7 Drawing Figures

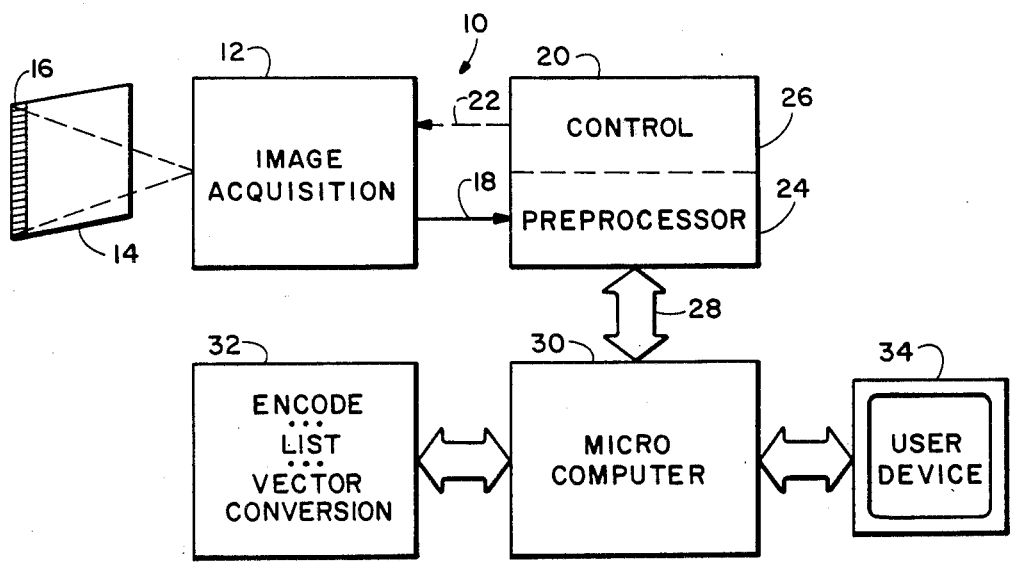
FIG. 1
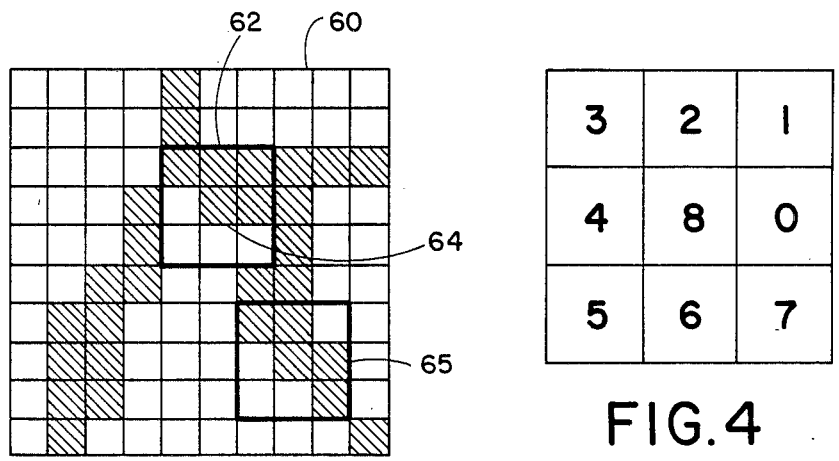
FIG. 3
FIG. 4

METHOD AND APPARATUS FOR FORMING 3×3 PIXEL ARRAYS AND FOR PERFORMING PROGRAMMABLE PATTERN CONTINGENT MODIFICATIONS OF THOSE ARRAYS

CROSS REFERENCE

This application is related to two other applications assigned to the same assignee as the present invention. Those applications are "Method of Pixel to Vector Conversion in an Automatic Picture Coding System" having Ser. No. 624,434 and filed on June 24, 1984, and Method and Apparatus for Input Picture Enhancement by Removal of Undesired Dots and Voids by the same inventors as the present application, having Ser. No. 712,306 and filed on Mar. 19, 1985.

BACKGROUND OF THE INVENTION

This invention relates to a hardware system for compressing information taken from existing documents for entry into a data base. More particularly, the invention relates to a method and apparatus for the high speed processing of raster-scanned data to effectively reduce the data necessary to represent lines and characters of the original document prior to storage of a vectorized representation of the original document in the data base.

Computer-aided design and drafting is practiced extensively in the engineering and graphic arts; however, there exists an extensive archive of documents generated manually or otherwise in pictorial form, i.e., more suitable for human interpretation than interpretation by machine. The demand for conversion of such archives to machine script will grow as the transition to computer-based graphics progresses and becomes more complete.

Techniques for automatically converting drawings and other pictures to machine script for processing, storage or display are well known. One of the most efficient and compact machine-script data sets representative of a picture comprises vectors including data items representing spatial location of the vectors with respect to the original picture. Generally, techniques for converting a picture into such vectorial data fall into two categories, viz.: line-following and raster-to-vector conversion. Line-following schemes, while generating vectorial data directly, require large and expensive assemblies that are best suited for high production environments. Line-following is said to be advantageous because the original picture is used as the image memory, instead of a bit-map copy of the picture in the computer memory. A "bit-map" is a signal set in machine script representing a tessellation of small picture elements or pixels of the original document. Generally, line-following imaging systems having devices that can be directed randomly in two dimensions to detect and follow picture features are either expensive or slow. An example of the former comprises a device utilizing a scanning laser beam which is directed by moving mirrors, and having acousto-optical devices for detecting features of the picture. An example of the latter is an electromechanical device such as a plotter having a light sensor instead of a pen. In some implementations, an operator manually guides a carriage along a line to be acquired; a photosensor detects when the carriage is directly over a line and enables the system to store X and Y coordinates of the carriage. By moving the carriage on an irregular path over the line, the intersections of the path and the line are stored as end points of a string of vectors. A totally automatic line-following system must first scan the entire picture to locate lines and features, and maintain a data-storage bookkeeping system to preclude duplicate storage of data. Otherwise, an operator must locate lines and direct the process, line by line.

In raster-to-vector conversion systems, the original picture or its microfilm is scanned, e.g., optically, and the information thereon resolved into a bit-map. The optical characteristics of each pixel are used to control detection circuits that generate positionally defined signals of the bit-map. An advantage of raster-to-vector conversion systems is that raster-scan imaging devices are inexpensive and prevalent; however, this kind of system has commonly required storage of the entire image as a bit-map in a data store accessible by a computer, the computer then executing a program for converting the bit-map to a vectorial data set.

The storage of a bit-map copy of a picture requires a large data store. For example, a bit stream acquired from raster scanning an E-size drawing with a resolution of 0.1 millimeter comprises approximately 100 million bits of data. A "bit stream" means a sequence of electrical signals or pulses comprising a set of binary digits representing data in coded form wherein the significance of each bit is determined by its position in the sequence and its relation to other bits. Various data reduction algorithms based on information and coding theory have been utilized to achieve significant reduction in the storage requirement for scanned data. Unfortunately, however, the form of representation of data as coded messages generally lacks information necessary for reconstituting regular line drawings.

Previously, software has been used to process digitized drawings, before vectorization by grouping adjacent pixels into small arrays, and altering some of the pixels depending on the configuration. This required a lot of time and system resources.

It would be desirable to have a compact, high speed, lower cost hardware system with the capability of varying the raster lengths for various sized drawings while incorporating the benefits of the software approach programmable patterns through the utilization of readily available and inexpensive components such as TTL and CMOS devices.

SUMMARY OF THE INVENTION

In accordance with the illustrated embodiment, the present invention provides a system for forming sequential windows of a predetermined size from a raster-scanned pixel bit stream from a selected document. Each of the windows is then examined using a selected one of several known algorithms for grouping adjacent pixels into smaller arrays to modify the raster-scanned bit stream before it is stored in a data base. In the most general case, each raster includes n (positive integer) pixels and the system operates on a bank of m (positive integer) sequential windows with each window being k ( odd integer of 3 or more) wide and J ( odd integer of 3 or more) high.

The system includes a counter for selecting each of the m windows sequentially. A pattern memory is included to store selected predetermined correction factors for each possible pixel pattern in each of the m windows. To select the appropriate pattern for the window being examined, a pattern selection memory is provided to address the pattern memory to make that selection. In addition, the bit values of the window being examined are applied to the balance of the address lines of the pattern memory. In response thereto the appropriate correction factor is selected and stored in a single bit delay to be used as the first bit of the next window. In addition, a register file is provided for receiving the bit values of the first (J−1) pixels in each of the k rasters of the present window to be shifted to become the bit values for the last (J−1) pixels in the next window. Also, the bit value of each of the last pixels in the first (k−1) rasters of the present window are applied to an (n−1) raster delay storage and the output bits of that storage unit are provided to the pattern memory for the first pixel in the last (k−1) rasters of the next window. This sequence thus progresses similarly for subsequent windows.

DESCRIPTION OF THE DRAWINGS

A full understanding of the present invention will be obtained from a detailed description given hereinbelow and the accompanying drawings. In addition, the drawings are given by way of illustration only, and thus are not limitative of the present invention. Further, wherein:

FIG. 1 is a block diagram of an automatic picture coding system in accordance with the instant invention.

FIGS. 3 and 4 illustrate a data format utilized in the practice of the present invention.

DESCRIPTION OF THE PREFERRED EMBODIMENT

Figure 2:
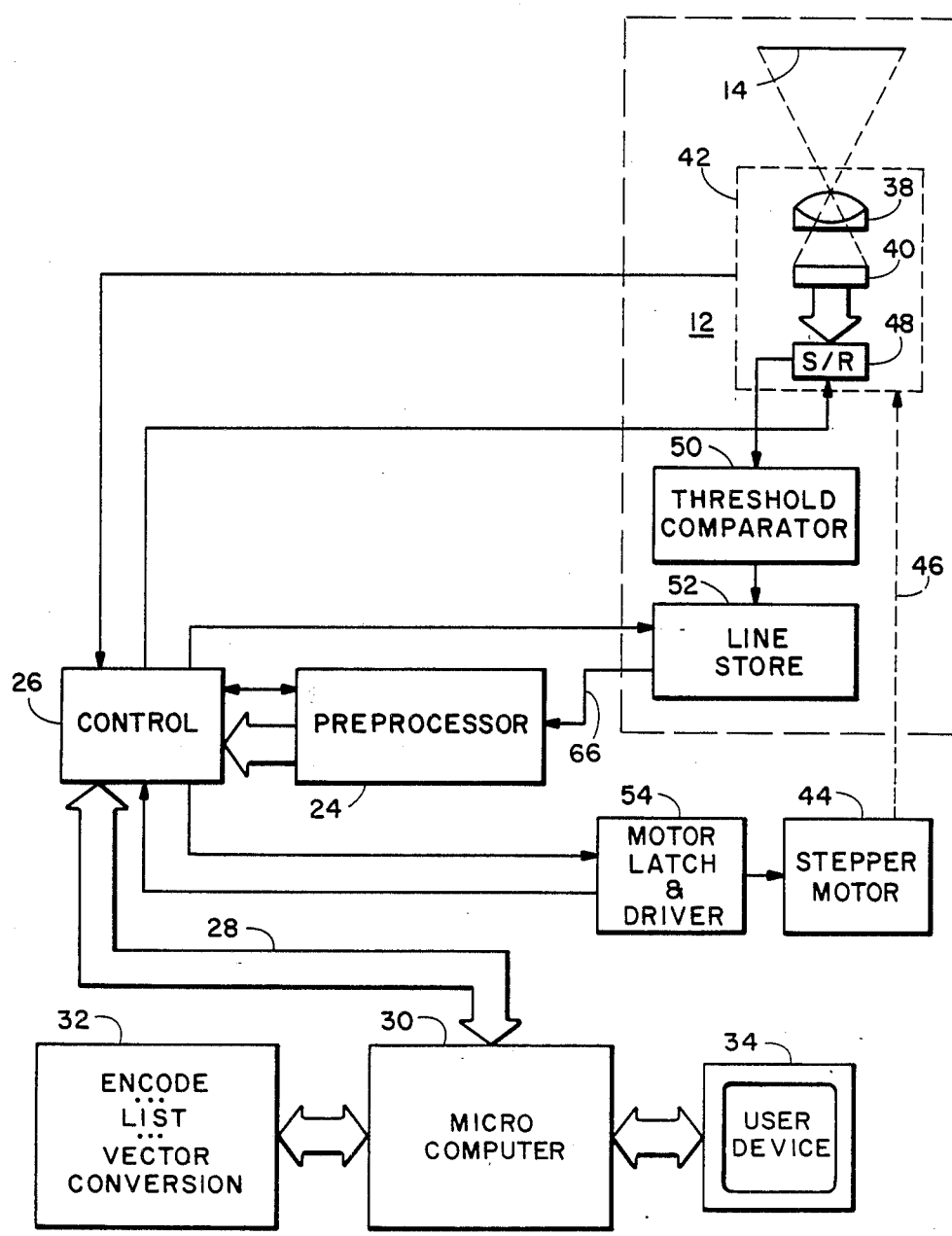
FIG. 2 is a more detailed block diagram of the system of FIG. 1.

FIG. 1 shows a simplified block diagram of an automatic picture coding system 10 of the first reference cross-referenced above. That picture coding system 10 comprises an image acquisition element 12 which converts an image of a document 14 into electrical signals. A variety of means may be utilized to acquire an image of a document including scanners wherein the document to be read is moved past a fixed sensor and light source. An example is the facsimile drum scanner in which the original is attached to the outside of a rapidly rotating cylinder moving slowly along its axis with respect to the sensor, thus producing a raster-scanned image of the document. In a variation of the foregoing, the original document and the detector remain fixed and the scanning is effected by moving mirrors. A second type of scanner is one in which a small intense spot of light is scanned over a document, light reflected from the document being detected by a single-element detector with no particular directional characteristics. Such scanners include laser scanners having moving mirrors which scan a laser spot across the picture. A moving spot may also be produced by focusing the face of a raster-scanned CRT onto the document. Another scanning approach involves scanning the document or an optical image of the document, with an area detector such as a vidicon or a solid-state imaging array.

The image acquisition element 12 of system 10 utilizes a form of raster scanning to dissect an optical image of the document 14 into a plurality of columns of square picture elements or pixels, one of which columns 16 is depicted in FIG. 1. A linear array of photosensitive charge-coupled devices (CCD) could be used to sense one entire column 16 of contiguous pixels of the appropriately illuminated document 14. The light intensity in each pixel is compared with a threshold value and converted to a binary digital signal representing either a black or a white area of the document 14. The electrical signals representing the column 16 are coupled via a connection 18 to a digital hardware element 20. The entire document 14 is scanned by successively repositioning the linear CCD imaging array in the direction perpendicular to the column 16 by mechanical means 22 responsive to the digital hardware element 20. The result is a digital image in the form of a serial matrix or bit-map having elements representing the entire document 14.

The digital hardware element 20 comprises a preprocessor 24 and a control logic element 26. The preprocessor 24 receives the serial digitized data from the image acquisition element 12 and performs a series of high-speed transformations on the data as it is received. The preprocessor 24 changes the data from a bit-map representation of the sensed image into a compact feature representation by performing selected preprocessing operations such as smoothing, growing, thinning, removing dots and voids, etc. Smoothing is a process which removes spurious points adjacent to a line, growing fills discontinuities in lines and broad features, thinning reduces broad features to skeletal lines usually no more than one pixel wide, and the process to remove dots and voids eliminates any representative dark or light areas that are smaller than the smallest information size designated by the user in the original drawing. The transformed data is transferred via a bus 28 to a microcomputer 30 for additional, high-level processing. The data output from the preprocessor 24 to the microcomputer 30 is still a bit-map representation of the document 14; however, only pixels associated with line data and edges are output to the microcomputer 30. The data is transferred in real time as the document 14 is being scanned. The microcomputer 30, under control of a software module 32, encodes and lists the data, and converts the listed data into an abstraction comprising a list of vectors representing the original document. When the image of the document 14 has been thus encoded as vectors, the data can be easily edited, displayed and stored, or otherwise processed by a user device 34.

The control logic 26 serves as an interface between the microcomputer 30, the preprocessor 24, and the image acquisition element 12, providing control, sequencing and timing functions. Among these functions are control of the mechanical means 22 for scanning the imaging array as well as data transfer functions.

Referring now to FIG. 2, the automatic picture coding system 10 of FIG. 1, is shown in greater detail. The image acquisition element 12 comprises a lens 38, and an image detector 40. Document 14 is mounted on a rotating drum and one column of the document is focused onto the image detector 40 which, for illustrative purposes, is shown as a linear CCD photodiode array having N photosensitive elements receiving photons from the column 16 (N is the maximum number of pixels around the circumference of the drum. Alternatively, the CCD photodiode array may scan a plurality of columns along the axis of the drum and store this data for the entire circumference of the drum. The lens 38 and image detector 40 are mounted on a carriage 42 which is connected to a stepper motor 44 by mechanical means 46. The charge is transferred from the photodiodes to a CCD analog shift register 48. After the transfer, the photodiodes 40 once again begin integrating light while the sensed charge pattern is shifted through the CCD analog shift register 48 to a threshold comparator 50. Each of the output voltages of the charge-pattern sequence representing the light striking each of the photodiodes in sequence along the array 40 is compared to a predetermined threshold voltage in the threshold comparator 50 and regenerated as a binary signal representative of the light/dark pattern of the sensed line wherein a binary "one" represents a black or dark area and "zero" represents a white or light area. A column or line of data sensed by the CCD array 40 is referred to herein as a "raster" of data, or simply, a raster. The image data from the CCD photodiode array is stored in a line store 52.

New data is acquired by the image detector 40 while the previous image is being shifted out of the CCD shift register 48 into the line store 52. Thus, the stepper motor 44 is activated to begin moving the carriage 42 immediately after the transfer of data from the photodiode array 40 into the CCD shift register 48. The image detector 40 is moved on the carriage 42 which in the presently described embodiment is a micrometer driven translation stage, the micrometer 46 being turned by the stepper motor 44. The use of a stepper motor allows precise positioning of the array over a number of steps and allows the array 40 to be stepped intermittently precluding problems due to mechanical inertia. The stepper motor 44 is driven by a motor latch and drive circuit 54 in response to input signals from the system software.

A raster of data stored in the line store 52 is transferred one bit at a time on demand to the preprocessor or window processor 24 under control of the control logic 26, and while this transfer is occurring, another raster of data is being acquired by the image acquisition element 12. The window preprocessor 24 thus processes successive rasters of data as they are acquired utilizing a technique known in the art as "neighborhood" or window logic. Neighborhood logic refers to an operation performed digitally on an array of data A(I,J) which is carried out so as to transform A(I,J) into a new data array A'(I,J) wherein each element in the new array has a value determined only by the corresponding element in the original array along with the values of its nearest neighbors. The nearest neighbor configuration is called a "window" and apparatus performing operations on arrays of identically configured windows is called window logic.

Referring to FIG. 3, there is shown a bit-map 60 a portion of a scanned document with successive raster portions being arranged vertically in the figure. A 3-pixel wide by 3-pixel high section of the bit-map 60 is defined as a window 62. A window such as the window 62 may be centered at any pixel in the image. Although a window such as the window 62 of the presently described embodiment of the invention is a square tessellation, other tessellations may be utilized. The window preprocessor 24 examines each of the 3×3 windows in the image serially a number of times and, based on the pattern of light and dark pixels within the window, changes a center pixel 64 from light to dark, from dark to light, or leaves it unchanged. This operation, applied sequentially to windows centered at each pixel in the image and, in some instances, repeated a number of times, performs all image transformations involved in thinning, growing, noise elimination and smoothing of the image.

FIG. 4 represents a window of pixel data having 9 pixels labeled 8-0 as shown. The instant invention utilizes a data format wherein each window is expressed as a 9-bit binary word, each of the bits of the word having a numbered location in the window which corresponds with the binary weight of the bit i.e., the most significant bit of the binary word corresponds with the center pixel ($2^8$); the least significant bit, with the pixel to the right of the center pixel ($2^0$) in FIG. 4. The window 62 of FIG. 3 is thus expressed as a binary number 100,001,111, or $417_8$ in octal notation. A window 65 of FIG. 3 is expressed as $110,001,101_2$ or $615_8$ in the data format of the instant invention. Each window pattern thus has a unique number associated with it which represents one of 512 ($2^9$) possible patterns. This unique number is used in the window processor as a table-lookup instruction to determine a value to use in the next window. For example, the window $400_8$ represents a single isolated black pixel in a field of white and may be considered as noise. The noise can be removed by loading a zero into the table location corresponding to the window $400_8$. The window processor would then output a zero to the next window for every occurrence of $400_8$. Similarly, a window $377_8$ having a white pixel in a field of black can be filled in by generating a "1" for the next window.

Figure 5:
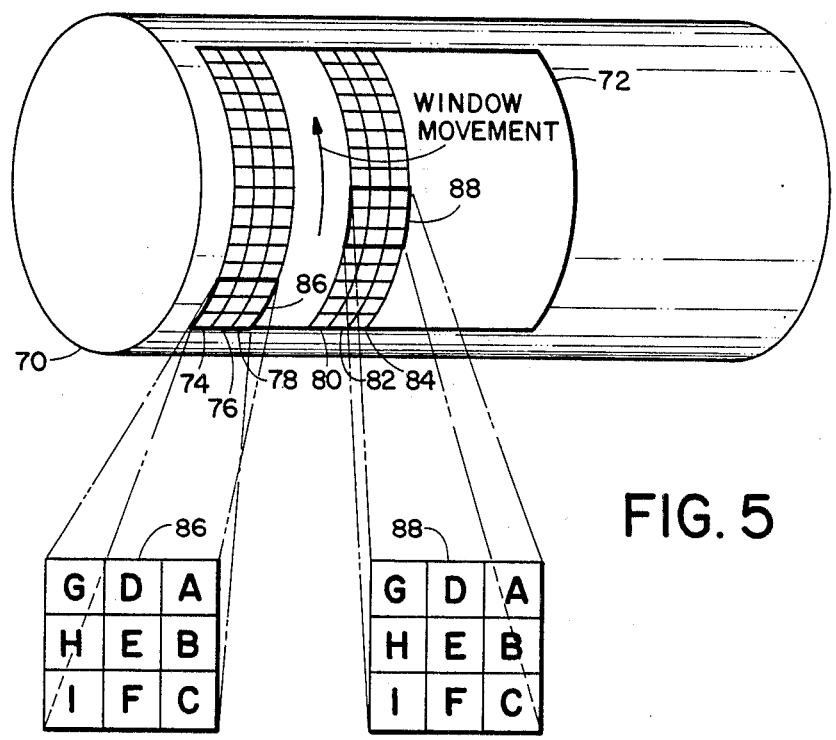
FIG. 5 illustrates the mounting of the document to be stored electronically on a drum including a representation of the rasters, pixels and windows used by the present invention.

In the FIG. 4 representation of a window, the three raster portions, formed respectively by pixel groups 1,0,7; 2,8,6; and 3,4,5 reside in three successive rasters of data. Referring now to FIG. 5, a document 72 is shown mounted on a rotating drum 70 with a portion of the effective rasterization of the document superimposed thereon. There is shown individual vertically oriented rasters 74–84, each divided into a number of squares to represent the individual pixels. In addition, two data windows 86 and 88 are also shown. As will be discussed below, the window of data used during the processing may be different from an "actual" window of data in the document due to the processing algorithms being used. Further, since each pixel of data will be used repeatedly in numerous windows, the detector 40 (see FIG. 2) reads the information, from the document pixel by pixel only once. Thus, in window 86, pixels A–C, D–F and G–I correspond to three of the pixels in each of rasters 78, 76 and 74, respectively, with pixel A being the most recently acquired, and pixel I being the earliest acquired by detector 40 or from the previous window.

Figure 6:
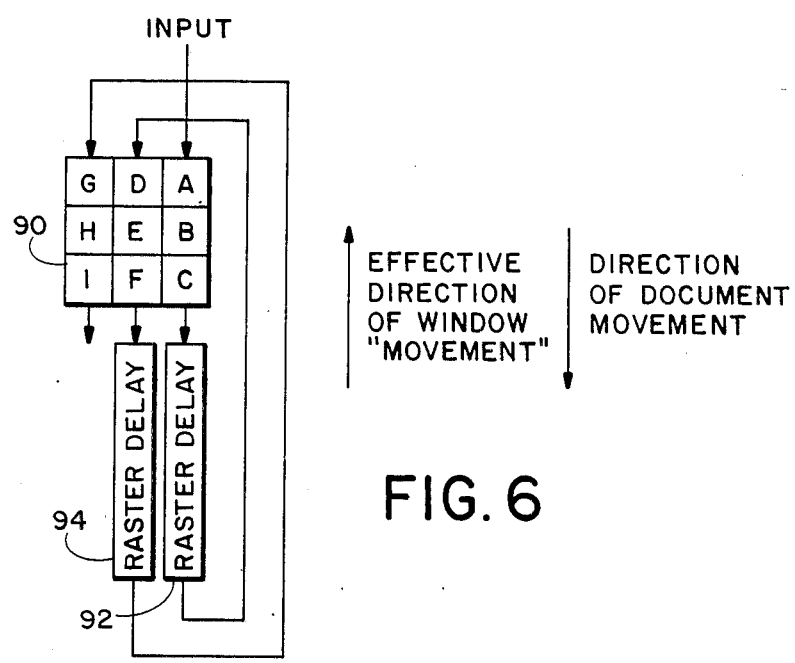
FIG. 6 shows a simplified representation of a single window generation technique of the present invention.

Referring now to FIG. 6 in conjunction with FIG. 2, the bit stream from the line store 52 is input to the window processor 24 via a bus 66. All nine bits of a window are examined simultaneously utilizing a tapped delay-line structure comprising 1-bit delay elements for each of the nine bit positions of window 90 and two (n−3)-bit delay elements 92 and 94, where n is equal to the integer number of pixels in a single raster scan of the document being digitized and entered into the data base. As the serialized data is received from line store 52, each bit represents a new bit "A", the previous bits then ripple through the corresponding storage units "B" and "C", then raster delay 92, into the next raster positions of "D", "E" and "F", and raster delay 94, then finally into the third raster positions of "G", "H" and "I". The value from the table look-up instruction for one window then progresses to position "A" of the next window, or to microcomputer 30 if the function of preprocessor 24 is complete. Thus, with respect to the configuration of FIG. 5, window 90 has an effective direction of movement in the upward vertical direction and the document being scanned is moving in a downward vertical direction.

Figure 7:
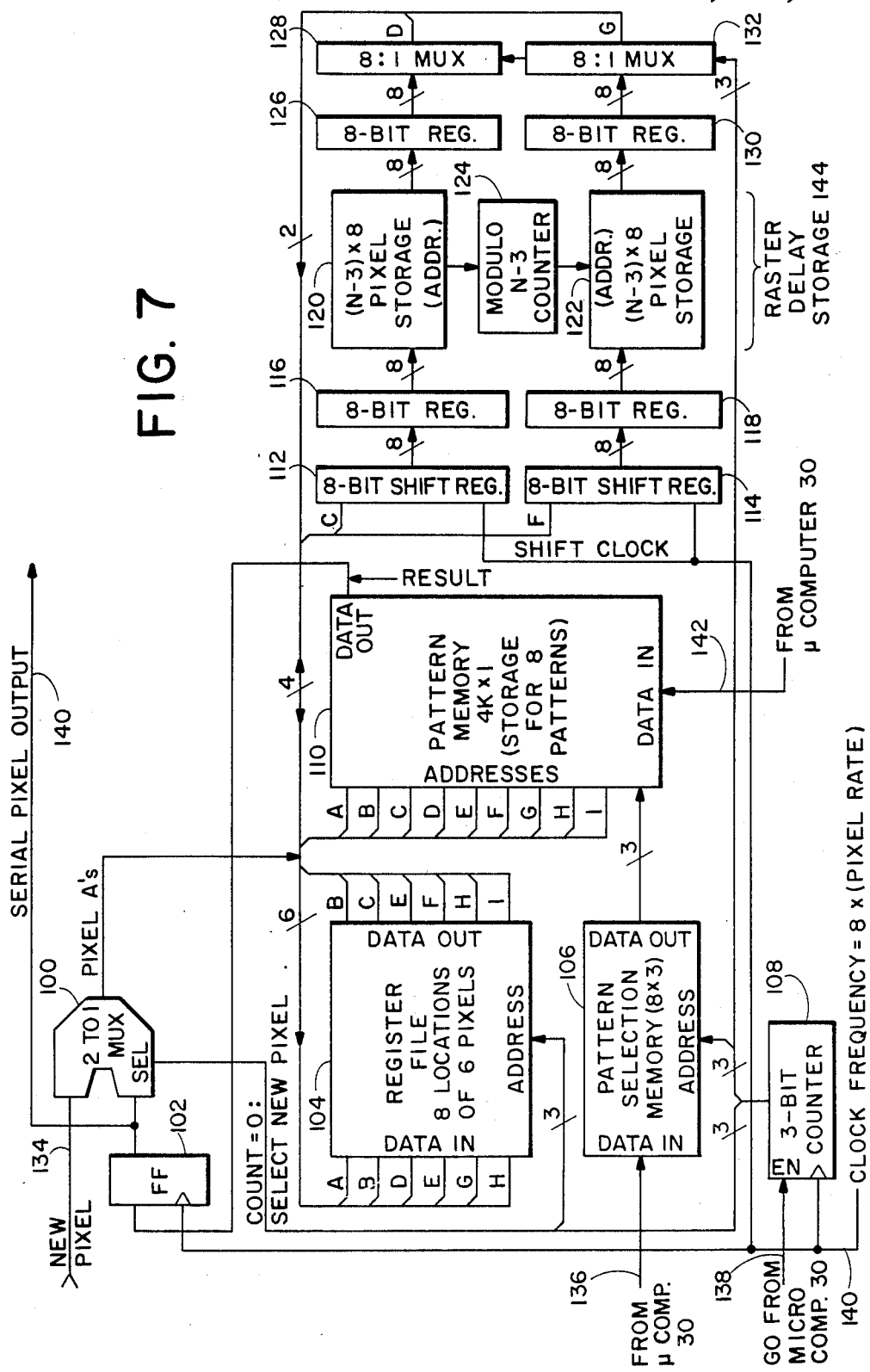
FIG. 7 shows a detailed block diagram of the present invention.

Referring now to FIG. 7, there is shown a detailed block diagram of a particular embodiment of the present invention. Stated in the simplest terms, the embodiment of FIG. 7 is a cascading of eight of the 3×3 window arrays shown in FIG. 6. More completely, the circuit of FIG. 7 embodies a scheme for constructing eight non-recursive, 3×3 pixel arrays, or windows, on which a pattern "look-up" is performed on each window. Prior to the array construction and pattern "look-up", the patterns and pattern selections for the algorithm of interest are loaded into pattern memory (RAM) 110 and pattern selection memory (RAM) 106 from microcomputer 30 and the bit values for pixels B-I of the first window are reset to zero. As discussed above, a pattern is a cluster of 512 bits with each bit representing either a written or unwritten pixel in an arrangement that determines an improved output by representing a vector segment (i.e., connectivity) by the minimum number of pixels based on each of the possible 512 input windows. For purposes of discussion, a pixel with a bit value of 1 will be considered to be written, whereas a pixel with a bit value of 0 will be considered to be unwritten. The addition of pattern selection allows for the selection of a different pattern for each of the cascaded windows to be stored in pattern memory 110 independent of the order in which they will be used, with microcomputer 30 controlling their ordering via pattern selection memory 106, the output signal of which provides additional address information to pattern memory 110. The balance of the address information for pattern memory 110 is provided by the bit information of the nine pixels (A-I) which make-up the window being observed.

This bank of eight windows receives the pixel data serially from image acquisition 12 (FIG. 1) or another bank via new pixel input line 134. The new pixel is then applied to the first window in the bank as pixel A and will only be seen by that window since pixel A of each of the subsequent windows is determined by the output state of pattern memory 110 as discussed below. Note, that the output signal of 3-bit counter 108 determines which window is being observed and the sequence of the windows (000 for the first window and 111 for the eighth window). With a 000 output state from counter 108, pixels B, C, E, F, H, and I are read from register file 104, pixel A from multiplexer (MUX) 100 and pixels D and G from Muxs 128 and 132, respectively, to construct the first window of the bank for the balance of the address signals to pattern memory 110. In keeping with the algorithms developed by Arcelli and Rosenfeld for processing digitized, raster-scanned documents, the bit values of each of the pixels in the 3×3 window together determine whether the center, or E pixel, bit value is a 1 or a 0 for subsequent processing of the raster-scanned bit stream. Thus, the new bit value of the center pixel in the first window resulting from the look-up operation of pattern memory 110 and output therefrom is stored in flip-flop 102 to be used as the bit value for pixel A in the second of the eight windows in the bank. Before the output count of counter 108 is advanced, the current bit values of pixels A, B, D, E, G, and H are rewritten into register file 104, and the current bit values of pixels C and F are written into 8-bit shift registers 112 and 114, respectively, and thereafter into the two 8-bit holding registers 116 and 118, respectively.

Counter 108 is then incremented to create the second window. The bit value for pixel A is the output state of flip-flop 102 since Mux 100 only selects a new pixel when the count from counter 108 is 000. The bit values for pixels B, C, E, F, H, and I are obtained from register file 104 and those bit values correspond to the bit values of pixels A, B, D, E, G, and H, respectively, of the previous time that window was accessed. As for the first window in the bank, the bit values of pixels D and G is obtained from Muxs 128 and 132, respectively under the control of counter 108. The output state from pattern memory 110 thus provides the bit value for pixel A in the next window as discussed above.

During a complete cycle of counter 108, the bit value of 16 pixels (pixels D and G of each window) must be recalled from raster delay storage 144 (where the (n−3) bit values of the pixels in each raster-scan which are not currently in a window are stored), the bit values of 16 other pixels (pixels C and F of each window) must be transferred from holding registers 116 and 118 to raster delay storage 144, and the modulo (n−3) counter 124 must be incremented to cause the bit values to ripple through (n−3) pixel storage registers 120 and 122 all of the raster delay storage 144. Here it should be noted that the use of dynamic memory for a variable length shift register structure, such as this, for the raster delay storage 144 makes it possible to utilize the same circuit configurations for all document sizes. When counter 108 rolls over to 000 each time, a new first window will be viewed. This effectively causes the windows to move over the document allowing each portion of the document to be observed and processed before vectorization occurs. By the selection of a clock signal having a frequency equal to 8 (the number of windows in the bank) times the pixel rate, the bit value of a pixel is available on line 146 for further processing or storage by a subsequent device.

An eight window bank, as shown in FIG. 7 was selected since it provides economy in motherboard size and complexity and product package count. Pattern memory 110 in this embodiment is a 4K×1 RAM to accommodate the 8 times 512 data locations necessary for the eight windows of the bank. The pattern selection memory 106 is an 8×3 RAM to allow the random storage of the eight patterns in the pattern memory 110.

While this invention has been described in terms of one preferred embodiment of a bank of eight windows, it is contemplated that persons reading the preceding descriptions and studying the drawings will realize various alterations and modifications where a bank may have other than eight windows and each window may be other than 3-pixels by 3-pixels. It is therefore intended that the following appended claims be interpreted as including all such alterations and modifications as fall within the true spirit and scope of the present invention.

What is claimed is:

1. A system for operating on a raster-scanned pixel bit stream from a selected document under the control of a microcomputer to form a bank of windows wherein each window is examined and a selected different algorithm for grouping adjacent pixels into smaller arrays is applied to each window to create a modified raster-scanned pixel bit stream before vectorization and storage of the bit stream in a data base, each raster includes n pixels, there is a total of N rasters, the bank includes m windows and each window is k-pixels wide by j-pixels high such that there are k-pixel columns and j-pixels rows within each window, wherein N and n are integers of 3 or greater, m is an interior of 1 or greater, and k and j are integers less than or equal to N and n, respectively, and greater than or equal to 3, wherein said pixel bits are transmitted at a selected rate, said system comprising:

clock means for generating an output signal equal to m times the pixel bit rate;

counter means for sequentially selecting the m windows in the bank under the control of the output signal of the clock means;

read/write pattern memory means disposed to receive from the microcomputer correction factors corresponding to the selected algorithm for each of m patterns, with each pattern including 2 to the kj power correction factors, one each for each of the possible pixel bit patterns in the k-pixel by j-pixel window, wherein the bit values of each pixel in the window provide a portion of the address word to the read/write pattern memory means;

read/write pattern selection means disposed to receive from the microcomputer information as to which set of correction factors loaded into the pattern memory means is to be used for which of the m windows wherein the counter means provides additional address information to the read/write pattern selection memory means;

delay means under the control of the output signal of the clock means for receiving and holding the selected correction factor bit from the read/write pattern memory means;

first multiplexer means disposed to receive at its output terminals the raster-scanned pixel bit stream and the delay bits from the delay means for selectively coupling one of said input signals to a first address port of the pattern memory means which corresponds to a particular bit position in the window in response to the output signal from the counter means, wherein a bit is selected from the raster-scanned pixel bit stream when the counter output signal corresponds to the first window and the output bit of the delay means is selected for all other output signals of the counter means;

register file means for receiving the pixel bit values for the first through the j−1 st pixel positions in each of the k pixel columns in one window for reassignment as the pixel bit values for the second through the j th pixel positions in each of the k pixel columns, these reassigned bit values then being applied to the pattern memory means as said portion of the address word; and (n−j)xm raster delay storage means for storing the bit values for those pixels not currently in the window by receiving as input signals the bit values of the j th pixel in the first k−1 pixel columns of the window currently being examined and by providing the bit values for the first pixel in each of the last k−1 pixel columns of the next window to the corresponding address lines of the pattern memory means under the control of the clock and counter means.

2. A system as in claim 1 wherein said raster delay storage means includes:

(k−1) storage registers where each such register is a (n−j)xm register; and modulo (n−j) counter means for generating an output signal that is applied to each of said (k−1) storage registers for controlling those registers.

3. A system as in claim 2 wherein each of said (k−1) storage registers includes a dynamic register the length of which can be adjusted for all possible values of the variable n.

4. A system as in claim 1 wherein said (n−j)xm raster delay storage means provides the most recent pixel bit values of the last (k−1) pixel columns of the window with those pixel bit values being a second portion of the bits of the address to the read/write pattern memory means.

5. A system as in claim 1 wherein the read/write pattern memory means includes a $2^{kj}$x1 random access memory.

6. A system as in claim 1 wherein said read/write pattern selection means includes an mxp random access memory with p being the integer number of binary bits necessary to express the number m, said memory providing p bits of address data to said read/write pattern memory means.

7. A system as in claim 1 wherein variables k and j each equals 3 such that the window is 3-pixels wide by 3-pixels high.

8. A system as in claim 7 wherein variable m is equal to 8.

9. A system as in claim 8 wherein the register file means includes a 6 bit by 8 bit register.

* * * * *